United States Patent
Yamamoto et al.

(10) Patent No.: US 9,374,849 B2
(45) Date of Patent: Jun. 21, 2016

(54) NODE AND LINK FORMATION METHOD

(71) Applicant: FUJITSU LIMITED, Kawasaki-shi, Kanagawa (JP)

(72) Inventors: Tetsu Yamamoto, Fukuoka (JP); Kazuya Kawashima, Fukuoka (JP); Tadashige Iwao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/038,825

(22) Filed: Sep. 27, 2013

(65) Prior Publication Data
US 2014/0022950 A1 Jan. 23, 2014

Related U.S. Application Data

(63) Continuation of application No. PCT/JP2011/058351, filed on Mar. 31, 2011.

(51) Int. Cl.
*H04L 12/28* (2006.01)
*H04W 84/18* (2009.01)
*H04W 40/30* (2009.01)

(52) U.S. Cl.
CPC .............. *H04W 84/18* (2013.01); *H04W 40/30* (2013.01)

(58) Field of Classification Search
CPC ..................................................... H04W 84/18
See application file for complete search history.

(56) References Cited

U.S. PATENT DOCUMENTS

| | | | |
|---|---|---|---|
| 2001/0033556 A1 | 10/2001 | Krishnamurthy et al. | |
| 2003/0079003 A1* | 4/2003 | Burr | 709/221 |
| 2007/0201418 A1* | 8/2007 | Kobayashi et al. | 370/338 |
| 2007/0223439 A1 | 9/2007 | Kosai | |
| 2007/0230390 A1 | 10/2007 | Takatani et al. | |
| 2007/0268821 A1 | 11/2007 | Levit et al. | |
| 2008/0186907 A1 | 8/2008 | Yagyuu et al. | |
| 2011/0038274 A1* | 2/2011 | Ikemoto et al. | 370/252 |

FOREIGN PATENT DOCUMENTS

| | | |
|---|---|---|
| JP | 2003-522495 | 7/2003 |
| JP | 2005-168020 | 6/2005 |
| JP | 2007-266697 | 10/2007 |
| JP | 2007-266883 | 10/2007 |

(Continued)

OTHER PUBLICATIONS

International Search Report mailed May 17, 2011 in corresponding International Application No. PCT/JP2011/058351.

*Primary Examiner* — Shaq Taha
(74) *Attorney, Agent, or Firm* — Staas & Halsey LLP

(57) ABSTRACT

A node receives, from a neighboring node that is a node in the neighborhood, neighboring node information indicating a node that neighbors the neighboring node and determines whether a common neighboring node is present, the common neighboring node being common amongst a neighboring node and a node indicated by the received neighboring node information. When it is determined that the common neighboring node is present, the node registers, in a storage unit, information that a link on a simplex path is to be formed with the common neighboring node or the neighboring node that is the source of the neighboring node information. Alternatively, when it is determined that the common neighboring node is not present, the node registers, in the storage unit, information that a link on a duplex path is to be formed with the neighboring node that is the source of the neighboring node information.

6 Claims, 8 Drawing Sheets

ROUTING TABLE (RT)

| | DESTINATION GD | FORWARDING DESTINATION CANDIDATE LD | ROUTE QUALITY INFORMATION | | |
|---|---|---|---|---|---|
| | | | Hop | ROUTE QUALITY | EVALUATION VALUE |
| N NUMBER | GD0 | LD00 | Hop00 | Q00 | E00 |
| | | LD01 | Hop01 | Q01 | E01 |
| | | LD02 | Hop02 | Q02 | E02 |
| | GD1 | LD10 | Hop10 | Q10 | E10 |
| | | LD11 | Hop11 | Q11 | E11 |
| | | LD12 | Hop12 | Q12 | E12 |
| | GDN | LDN0 | HopN0 | QN0 | EN0 |
| | | LDN1 | HopN1 | QN1 | EN1 |
| | | LDN2 | HopN2 | QN2 | EN2 |

(56) References Cited

FOREIGN PATENT DOCUMENTS

| JP | 2009-538027 | 10/2009 |
| JP | 2009-267532 | 11/2009 |
| WO | WO 01/58237 A2 | 8/2001 |
| WO | WO 2007/132469 A2 | 11/2007 |

* cited by examiner

FIG.3

ROUTING TABLE (RT)

| DESTINATION GD | FORWARDING DESTINATION CANDIDATE LD | ROUTE QUALITY INFORMATION | | |
|---|---|---|---|---|
| | | Hop | ROUTE QUALITY | EVALUATION VALUE |
| GD0 | LD00 | Hop00 | Q00 | E00 |
| GD0 | LD01 | Hop01 | Q01 | E01 |
| GD0 | LD02 | Hop02 | Q02 | E02 |
| GD1 | LD10 | Hop10 | Q10 | E10 |
| GD1 | LD11 | Hop11 | Q11 | E11 |
| GD1 | LD12 | Hop12 | Q12 | E12 |
| GDN | LDN0 | HopN0 | QN0 | EN0 |
| GDN | LDN1 | HopN1 | QN1 | EN1 |
| GDN | LDN2 | HopN2 | QN2 | EN2 |

N NUMBER

FIG.4

NEIGHBORING NODE TABLE (NT)

| NEIGHBORING NODE ID | QUALITY INFORMATION | NT | LT |
|---|---|---|---|
| LS0 | Q0 | NT0 | LT0 |
| LS1 | Q1 | NT1 | LT1 |
| LS2 | Q2 | NT2 | LT2 |
| LSk | Qk | NTk | LTk | k NUMBER

FIG.5

LINK TABLE (LT)

| LINK NODE ID | QUALITY INFORMATION |
|---|---|
| LN0 | Q0 |
| LN1 | Q1 |
| LNm | Qk |

} m NUMBER

FIG.6

| AD HOC HEADER | | | | HELLO MESSAGE HEADER | | | | |
|---|---|---|---|---|---|---|---|---|
| LD (6 BYTES) | LS (6 BYTES) | PACKET TYPE (1 BYTES) | PACKET LENGTH (2 BYTES) | NODE ID | NT LIST NUMBER (2 BYTES) | NT LIST NUMBER (2 BYTES) | NT LIST | LT LIST |

LINK TABLE (LT)

| LINK NODE ID | QUALITY INFORMATION |
|---|---|
| LN0 | Q0 |
| LN1 | Q1 |
| LN2 | Q2 |
| ⋮ | ⋮ |
| LNm | Qk | x NUMBER

NODE AND LINK FORMATION METHOD

CROSS-REFERENCE TO RELATED APPLICATION(S)

This application is a continuation of International Application No. PCT/JP2011/058351, filed on Mar. 31, 2011, the entire contents of which are incorporated herein by reference.

FIELD

The embodiments discussed herein are directed to a node and a link formation method.

BACKGROUND

In recent years, wireless ad hoc networks have been developed, which are self-contained distributed networks made up of terminals and do not use base stations or access points. A wireless ad hoc network is configured by connecting a large number of terminals (hereafter, referred to as nodes) capable of performing wireless communication with each other.

In this kind of wireless ad hoc network, each node exchanges a Hello message with different neighboring nodes so as to detect the presence of the neighboring nodes. A node then registers all the detected neighboring nodes in a link table so as to form a link on a duplex path with all of the neighboring nodes. After forming a link between nodes, each node uses the link table to perform a control on communication data forwarding.

An explanation is given here, with reference to FIG. 13, of an example of a link table. FIG. 13 is a diagram that illustrates an example of a conventional link table. As illustrated in FIG. 13, a link table stores therein, with respect to all neighboring nodes (in the example of FIG. 13, the number of nodes is x), "link node ID" for uniquely identifying a neighboring node and "quality information" that indicates the quality of communication from the neighboring node toward the subject node.

As to the examples of conventional technology, see Japanese National Publication of International Patent Application No. 2009-538027, Japanese National Publication of International Patent Application No. 2003-522495, Japanese Laid-open Patent Publication No. 2005-168020, and Japanese Laid-open Patent Publication No. 2007-266697, for example.

However, the above-described conventional technology has a problem in that the size of its link tables becomes large. Specifically, with the conventional technology, because all the neighboring nodes are registered in the link table, the number of entries in the link table becomes large, which results in an increase in the size of the link tables.

SUMMARY

According to an aspect of an embodiment, a node in a wireless ad hoc network including a plurality of nodes, the node includes a receiving unit, a determining unit, a first register unit, and a second register unit. The receiving unit is configured to receive, from a first neighboring node that neighbors the subject node, neighboring node information indicating a node that neighbors the first neighboring node. The determining unit is configured to determine whether a second neighboring node is present, the second neighboring node being common amongst a neighboring node that neighbors the subject node and a node indicated by the received neighboring node information. The first register unit is configured to, when it is determined that the second neighboring node is present, register, in a storage unit, information that a link on a simplex path is to be formed with the second neighboring node or the first neighboring node. The second register unit is configured to, when it is determined that the second neighboring node is not present, register, in the storage unit, information that a link on a duplex path is to be formed with the first neighboring node.

According to another aspect of an embodiment, a link formation method for a node that forms a wireless ad hoc network with a plurality of nodes, the node forming a link with a different node, the link formation method includes: receiving, from a first neighboring node that neighbors a subject node, neighboring node information indicating a node that neighbors the first neighboring node; determining whether a second neighboring node is present, the second neighboring node being common amongst a neighboring node that neighbors the subject node and a node indicated by the received neighboring node information; when it is determined that the second neighboring node is present, registering, in a storage unit, information that a link on a simplex path is to be formed with the second neighboring node or the first neighboring node; and when it is determined that the second neighboring node is not present, registering, in the storage unit, information that a link on a duplex path is to be formed with the first neighboring node.

According to still another aspect of an embodiment, a non-transitory computer-readable storage medium stored therein a link formation program which causes a computer, which is a node that forms a wireless ad hoc network with a plurality of nodes and forms a link with a different node, to execute a process including: receiving, from a first neighboring node that neighbors a subject node, neighboring node information indicating a node that neighbors the first neighboring node; determining whether a second neighboring node is present, the second neighboring node being common amongst a neighboring node that neighbors the subject node and a node indicated by the received neighboring node information; when it is determined that the second neighboring node is present, registering, in a storage unit, information that a link on a simplex path is to be formed with the second neighboring node or the first neighboring node; and when it is determined that the second neighboring node is not present, registering, in the storage unit, information that a link on a duplex path is to be formed with the first neighboring node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram that illustrates an example of a routing table;

FIG. 4 is a diagram that illustrates a neighboring node table;

FIG. 5 is a diagram that illustrates a link table;

FIG. 6 is a diagram that illustrates an example of the configuration of a HELLO frame;

DESCRIPTION OF EMBODIMENTS

Preferred embodiments of the present invention will be explained with reference to accompanying drawings. The present invention is not limited to this embodiment.

[a] First Embodiment

In the following embodiment, an explanation is given, step by step, of the configuration of a communication system according to a first embodiment, the configuration of a node in the communication system, and the process flow of the node. Finally, the advantages of the first embodiment are explained.

Configuration of Communication System

Figure 1:
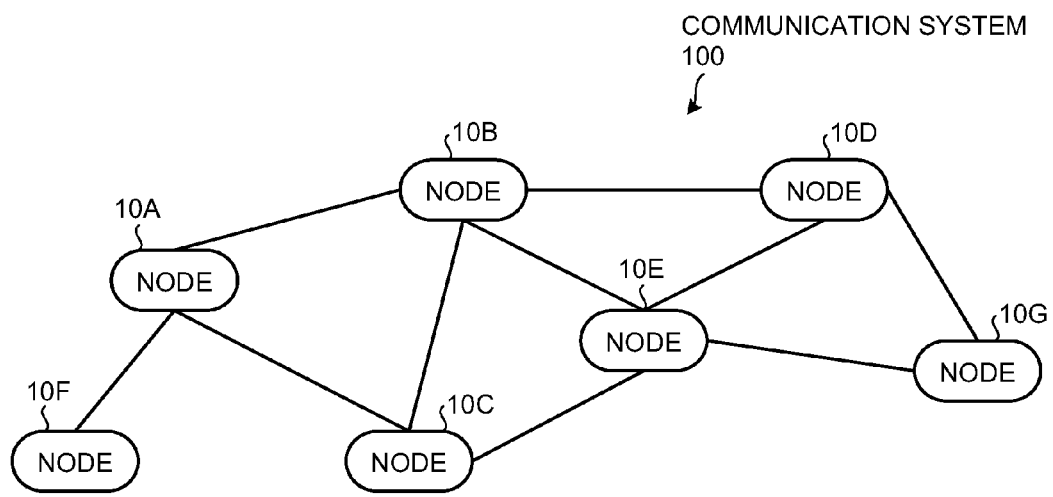
FIG. 1 is a diagram that illustrates the configuration of a communication system according to a first embodiment.

First, an explanation is given of the configuration of a communication system with reference to FIG. 1. FIG. 1 is a diagram that illustrates the configuration of a communication system according to the first embodiment. As illustrated in FIG. 1, a communication system 100 includes a plurality of nodes 10A to 10G that forms a wireless ad hoc network. The number of nodes that form a wireless ad hoc network is not limited to this.

The nodes 10A to 10G are communication devices with a close-range wireless communication function, such as computers. Each of the nodes 10A to 10G transmits and receives a HELLO message to and from their neighboring nodes on a regular basis, the message including node information, such as route information and communication quality information on the links between nodes. Here, a neighboring node refers to a different node within the range of wireless communication, i.e., a different node with which wireless communication can be performed with one hop. For example, if an explanation is given by using the example of FIG. 1, the neighboring nodes of the node 10A correspond to the node 10B, the node 10C, and the node 10F.

Each of the nodes 10A to 10G calculates the communication quality of each route that is obtained during the transmission and reception of HELLO messages, configures multiple routes to the final destination in accordance with the result, determines the optimum route, and generates a routing table. Furthermore, each of the nodes 10A to 10G recalculates, with regard to the configured routes, the communication quality of each route on the basis of the actual performance of data communication and the transmission and reception of HELLO messages with neighboring nodes, maintains the routes or works out the optimum route, and changes the routing table as needed.

Figure 2:
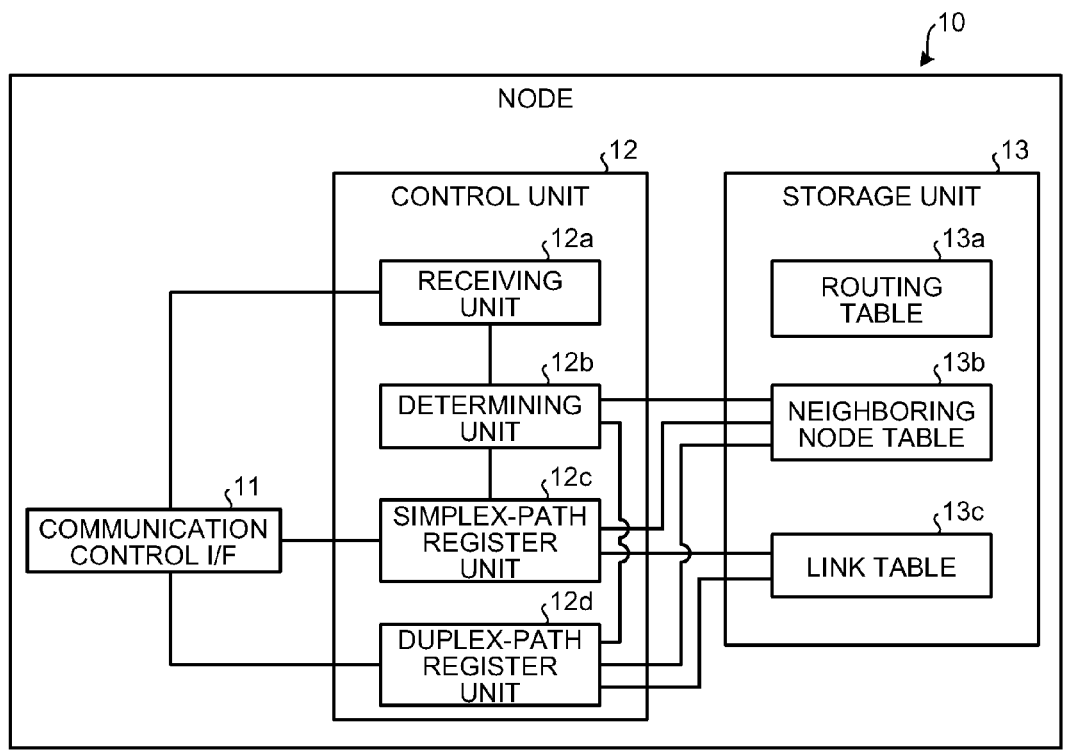
FIG. 2 is a block diagram that illustrates the configuration of a node according to the first embodiment.

Here, an explanation is given, with reference to FIG. 2, of the configuration of the node illustrated in FIG. 1. FIG. 2 is a block diagram that illustrates the configuration of the node according to the first embodiment. As illustrated in FIG. 2, a node 10 includes a communication control I/F 11, a control unit 12, and a storage unit 13. Processing performed by each of the units will be explained below. The nodes 10A to 10G illustrated in FIG. 1 have the same configuration. When the nodes 10A to 10G are explained without any distinction, they are referred to as the node 10.

The communication control I/F 11 controls the communication of the various types of information that are exchanged with a neighboring node. For example, the communication control I/F 11 transmits and receives HELLO messages to and from a neighboring node.

The storage unit 13 stores therein data and programs that are needed for various processes performed by the control unit 12. Furthermore, the storage unit 13 includes a routing table 13a, a neighboring node table 13b, and a link table 13c. The storage unit 13 is a semiconductor memory device, such as a random access memory (RAM), a read only memory (ROM), or a flash memory, or a storage device, such as a hard disk, or an optical disk.

The routing table 13a stores therein information about routes to a destination node. As illustrated in FIG. 3, the routing table 13a stores, for example, a destination GD (Global Destination), which is a global destination address, and stores a forwarding destination candidate LD (Local Destination), which is a forwarding destination address candidate. FIG. 3 is a diagram that illustrates an example of a routing table.

Here, a global destination address is a destination address indicating the final destination. Moreover, a forwarding destination candidate LD is a candidate for a forwarding destination address, to which a message needs to be subsequently forwarded when the message is to be transmitted to a GD address.

Furthermore, the routing table 13a stores, as route quality information, Hop, which is the number of hops to a destination; route quality, which is the route quality obtained by quantifying the delay on a route to a destination; and an evaluation value, which is the quality of communication from a target node toward the subject node. Here, the number of hops is the number of times a transmission needs to be performed so that a message reaches a GD address. The route quality is the communication quality of a route to a destination. Moreover, the evaluation value is the quality of communication during its return.

The neighboring node table 13b stores therein information about neighboring nodes. As illustrated in FIG. 4, the neighboring node table 13b stores, for example, a neighboring node ID for uniquely identifying a neighboring node and stores quality information that indicates the quality of communication from the neighboring node toward the subject node. Furthermore, the neighboring node table 13b stores a neighbor table (NT), which is a neighboring node table held by a neighboring node, and stores a link table (LT), which is a link table held by a neighboring node. FIG. 4 is a diagram that illustrates a neighboring node table.

The link table 13c stores therein information about nodes with which a link has been formed. As illustrated in FIG. 5, the link table 13c stores, for example, a link node ID for uniquely identifying a node with which a link has been formed and stores quality information that indicates the quality of a communication from a node, with which a link has been formed, toward the subject node. Furthermore, in the example of FIG. 5, the link table 13c stores therein m number of entries. FIG. 5 is a diagram that illustrates the link table.

Information about some but not all of the neighboring nodes is registered in the link table 13c by a simplex-path register unit 12c and a duplex-path register unit 12d, which will be described later. Details of the registration process will be explained later.

The control unit 12 includes an internal memory that stores therein programs that define various types of procedures, or the like, and data with which the control unit 12 performs various processes. The control unit 12 includes a receiving unit 12a, a determining unit 12b, the simplex-path register unit 12c, and the duplex-path register unit 12d. For example, in the node 10 according to the first embodiment, a central processing unit (CPU), a micro processing unit (MPU), or the like, is used as the control unit 12.

The receiving unit 12a receives, from a neighboring node that is a node in the neighborhood, neighboring node information indicating a node that neighbors the neighboring node and link information. For example, the receiving unit 12a receives a HELLO frame from a neighboring node and acquires a neighboring node table and a link table that are included in the HELLO frame. The acquired neighboring node table and the acquired link table are registered in the neighboring node table 13b of the storage unit 13.

Here, an explanation is given, with reference to FIG. 6, of a HELLO frame received by the receiving unit 12a. FIG. 6 is a diagram that illustrates an example of the configuration of a HELLO frame. As illustrated in FIG. 6, in a HELLO frame are set an ad hoc header, a HELLO message header, a neighboring node table (described as an NT LIST in FIG. 6), and a link table (described as an LT LIST in FIG. 6).

In the ad hoc header are set LD (local destination), which is the destination address of a HELLO frame; LS (local source), which is the address of a source node of a HELLO frame; packet type, which indicates the type of packet; and packet length, which indicates the size of packet. In the HELLO message header are set Node ID, which is an identifier of the source node of a HELLO frame; NT LIST number, which is the number of entries in a neighboring node table; and LT LIST number, which is the number of entries in a link table. The size of each piece of data is as illustrated in FIG. 6, i.e., LD has 6 bytes, LS has 6 bytes, packet type has 1 byte, packet length has 2 bytes, NT LIST number has 2 bytes, and LT LIST number has 2 bytes.

The determining unit 12b determines whether a common neighboring node is present, which is a node in common amongst a neighboring node that neighbors the subject node 10 and a node indicated by the received neighboring node information. For example, the determining unit 12b acquires neighboring node IDs from the neighboring node table (which corresponds to the item "NT" in the example of FIG. 4) of a different node that is registered in the neighboring node table 13b. The determining unit 12b then acquires neighboring node IDs that neighbor the subject node, the neighboring node IDs being registered in the neighboring node table 13b.

The determining unit 12b compares the node IDs that neighbor a different node with the neighboring node IDs that neighbor the subject node, thereby determining whether a common node ID is present. Accordingly, if there is a common node ID, the determining unit 12b gives an instruction to the simplex-path register unit 12c to form a link on a simplex path. If there is no common node ID, the determining unit 12b gives an instruction to the duplex-path register unit 12d to form a link on a duplex path with a neighboring node.

If the determining unit 12b determines that there is a common neighboring node, the simplex-path register unit 12c registers, in the link table 13c, information that a link on a simplex path is to be formed with the common neighboring node or the neighboring node that is the source of the neighboring node information. For instance, when receiving, from the determining unit 12b, the instruction to form a link on a simplex path, the simplex-path register unit 12c acquires the link table (corresponding to the item "LT" in the example of FIG. 4) of a different node that is registered in the neighboring node table 13b.

The simplex-path register unit 12c then selects the common neighboring node or the neighboring node that is the source of the neighboring node information in accordance with the link direction indicated by the link table of the different node and registers, in the link table 13c, information that a link on a simplex path is to be formed with the selected node. Afterward, if the link table of the subject node is updated, the simplex-path register unit 12c broadcasts the update to the link table 13c to the neighboring nodes by using a HELLO frame.

Figure 7:
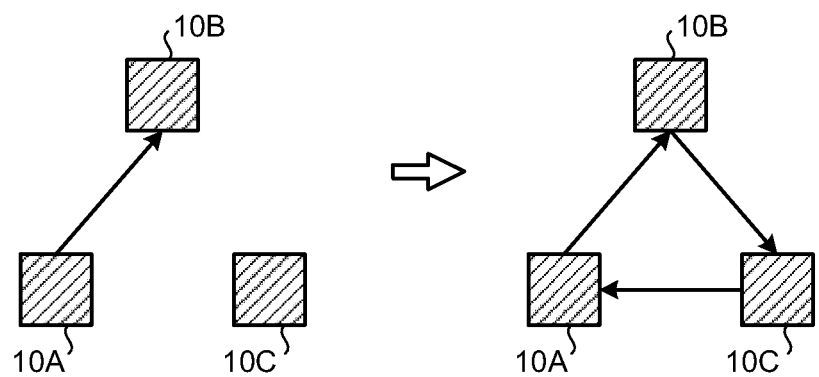
FIG. 7 is a diagram that illustrates a small loop that has a simplex-path configuration using three nodes.

As described above, an LT update is broadcast to the neighboring nodes by using a HELLO frame so that a neighboring node that receives the HELLO frame also performs the same link formation process. Thus, a small-loop link is formed as illustrated in FIG. 7. Here, by using the example of FIG. 7, an explanation is given of a small-loop link that has a simplex-path configuration using three nodes. FIG. 7 is a diagram that illustrates a small loop that has a simplex-path configuration using three nodes. The example of FIG. 7 illustrates that the common neighboring node 10C is between the node 10A and the node 10B.

First, as illustrated in FIG. 7, the node 10A forms a link on a simplex path with the node 10B and registers information on the node 10B in the link table 13c. The node 10A then broadcasts the LT update to the neighboring nodes 10B and 10C by using a HELLO frame. Afterward, each of the nodes 10B and 10C performs the same process to form a link on a simplex path, whereby a link on a simplex path is formed between the node 10B and the node 10C and a link on a simplex path is formed between the node 10C and the node 10A, as illustrated in FIG. 7. Thus, a small-loop link that has a simplex-path configuration is formed by using three nodes, i.e., the nodes 10A to 10C. In the example of FIG. 7, the arrows indicate the directions of the links.

Thus, a link relation is formed so that a minimum loop is configured, whereby the accessibility between nodes is ensured. Specifically, when the simplex-path configuration of a small loop using three nodes is formed, a node that is linked to the subject node can be used as a forwarding destination; therefore, there is no need for linking.

Thus, in the communication system 100, it is possible to ensure data accessibility between nodes and to reduce the number of entries registered in the link table 13c. An explanation is given by using the example of FIG. 7. The node 10A does not register information on the node 10C in the link table 13c nor form the link of "the node 10A→the node 10C" but does form the link of "the node 10A→the node 10B". Therefore, the node 10A can transmit data to the node 10C by using the node 10B as a forwarding destination.

If it is determined that there is no common neighboring node, the duplex-path register unit 12d registers, in the link table 13c, information that a link on a duplex path is to be formed with the neighboring node that is the source of the neighboring node information. For example, when receiving an instruction to form a link on a duplex path from the determining unit 12b, the duplex-path register unit 12d registers the neighboring node in the link table 13c. The duplex-path register unit 12d then broadcasts the update to the link table 13c to neighboring nodes by using a HELLO frame.

Thus, the duplex-path register unit 12d broadcasts the update to the link table 13c to neighboring nodes by using a HELLO frame so that the neighboring node that receives the HELLO frame also performs the same link formation process, whereby a link on a duplex path is formed.

Figure 8:
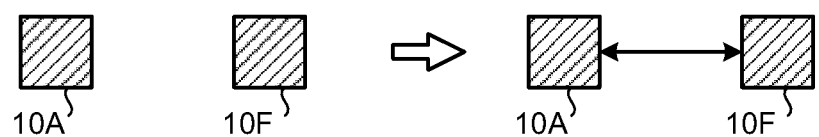
FIG. 8 is a diagram that illustrates a bidirectional link between two nodes.

By using the example of FIG. 8, an explanation is given here of a bidirectional link between two nodes. FIG. 8 is a diagram that illustrates a bidirectional link between two nodes. As illustrated in FIG. 8, there is not the neighboring node 10C that is common to the node 10A and the node 10F. Therefore, a bidirectional link is formed between the node 10A and the node 10F as illustrated in FIG. 8. Thus, the formation of a bidirectional link can prevent a node from being isolated, although it would not reduce the number of entries in the link table 13c.

Figure 9:
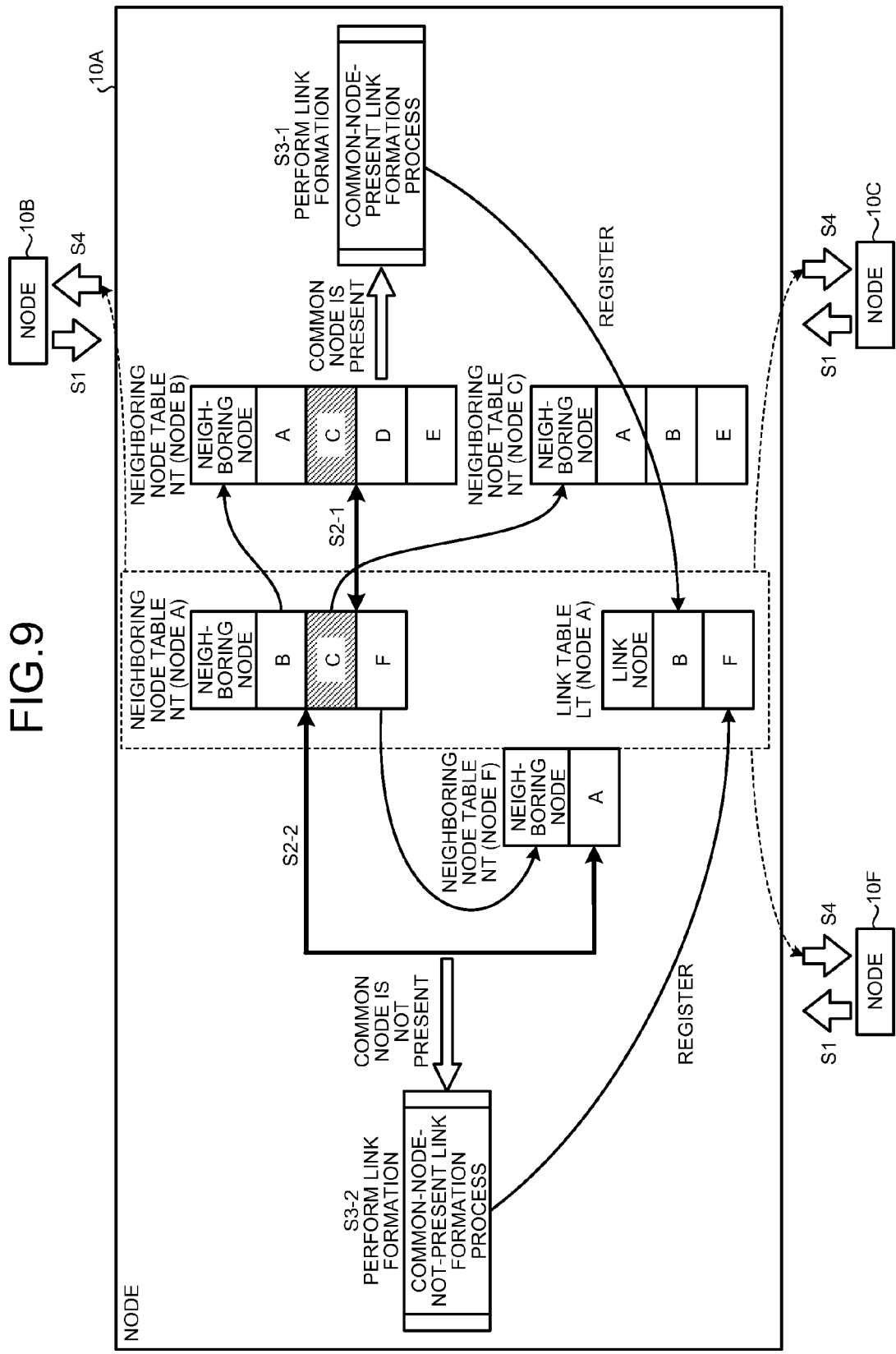
FIG. 9 is a diagram that illustrates a process to form a link between nodes.

Next, an explanation is given, with reference to FIG. 9, of a process to form a link between nodes. FIG. 9 is a diagram that illustrates a process to form a link between nodes. The process to form a link between nodes as described below is a process performed for a certain period of time after each node is started up in the communication system 100. As illustrated in FIG. 9, the node 10A receives HELLO frames from neighboring nodes, i.e., the nodes 10B, 10C, and 10F (Step S1). The node 10A then compares the IDs, "B", "C", and "F", which are stored in the neighboring node table 13b, of the neighboring nodes that neighbor this node with the IDs, which are contained in the received HELLO frame, of the neighboring nodes that neighbor the other node 10B, 10C, 10F.

An explanation is given by using the example of FIG. 9. The node 10A compares the IDs, "B", "C", and "F" of the neighboring nodes that neighbor this node with the IDs, "A", "C", "D", and "E" of the neighboring nodes that neighbor the node 10B (Step S2-1). The node 10A determines that the neighboring node ID "C" is a common neighboring node and then performs a common-node-present link formation process (which will be described in detail later with reference to FIG. 10) (Step S3-1). As the result of the processing, the node 10A registers the ID "B" of the node 10B as a link node in the link table 13c and forms a link on a simplex path with the node 10B. The node 10A then broadcasts the update to the link table 13c to the neighboring nodes by using a HELLO frame (Step S4).

Furthermore, the node 10A compares the IDs, "B", "C", and "F" of the neighboring nodes that neighbor this node with the ID "A" of the neighboring node that neighbors the node 10F (Step S2-2). The node 10A determines that there is no common neighboring node and then performs a common-node-not-present link formation process (which will be described in detail later with reference to FIG. 11) (Step S3-2). As the result of the processing, the node 10A registers the ID "F" of the node 10F as a link node in the link table 13c in order to form a link on a duplex path with the node 10F. The node 10A then broadcasts the update to the link table 13c to the neighboring node by using a HELLO frame (Step S4).

The node 10A compares the IDs, "B", "C", and "F" of the neighboring nodes that neighbor this node with the IDs, "A", "B", and "E" of the neighboring nodes that neighbor the node 10C. The node 10A determines that the neighboring node ID "B" is a common neighboring node and then performs the common-node-present link formation process (Step S3-1). As described above, as the link node ID "B" has been set as a link node in the link table, a simplex-path link has been formed from the node A toward the node B; therefore, the link node ID "C" is not registered as a link node in the link table.

Thus, the node 10A exchanges neighboring node information with a neighboring node and, if there is a common node, forms a simplex-path link among the three nodes, whereby it is possible to reduce the number of links compared to a case where a duplex-path link is formed and it is possible to decrease memory usage. When the process to form a link between nodes is finished, each node 10 performs a process to delete the neighboring node table 13b or saves the neighboring node table 13b in an external device.

Process Performed by a Node

Figure 10:
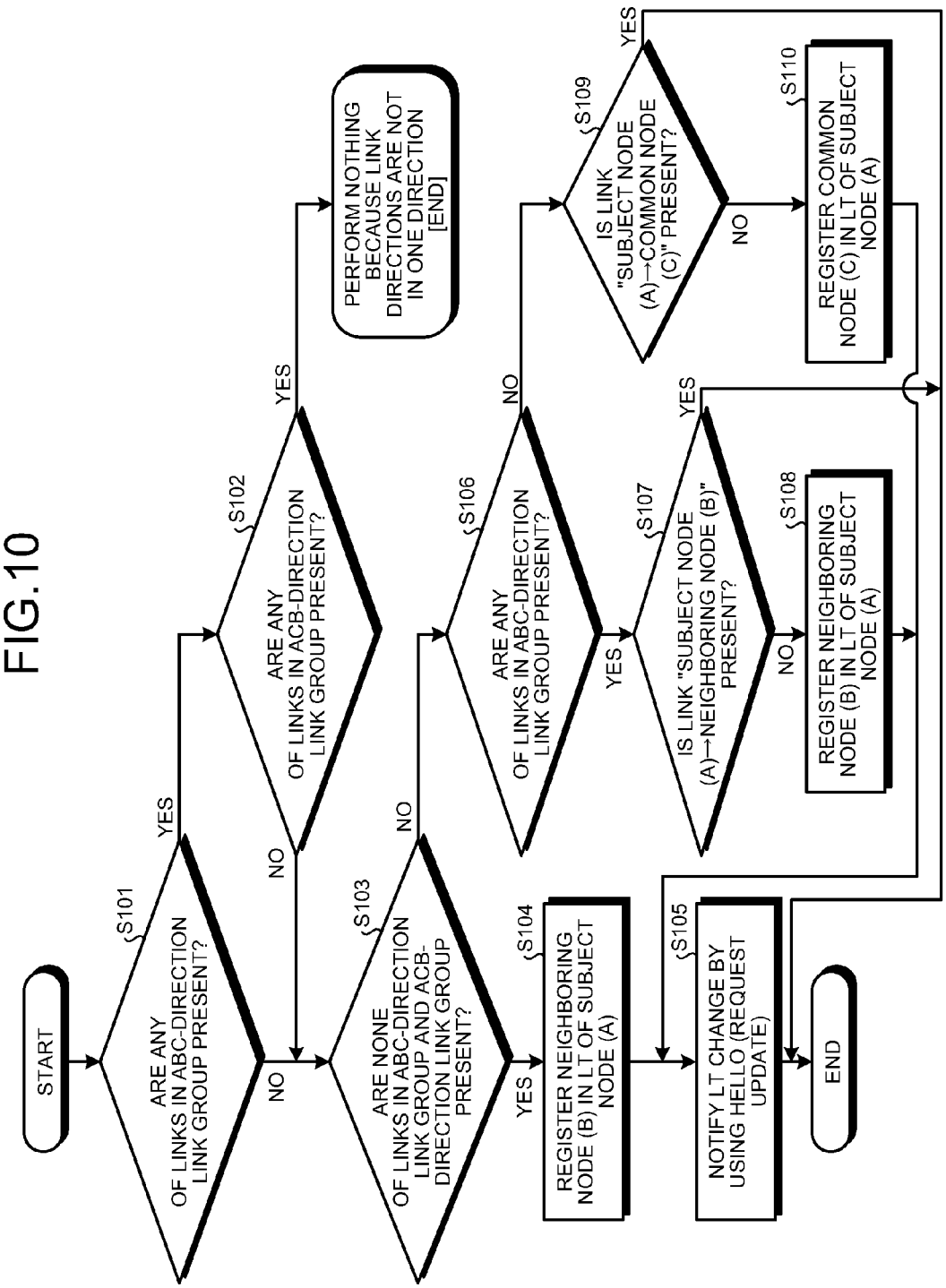
FIG. 10 is a flowchart that illustrates the steps of a node link formation process performed when there is a common neighboring node.
Figure 11:
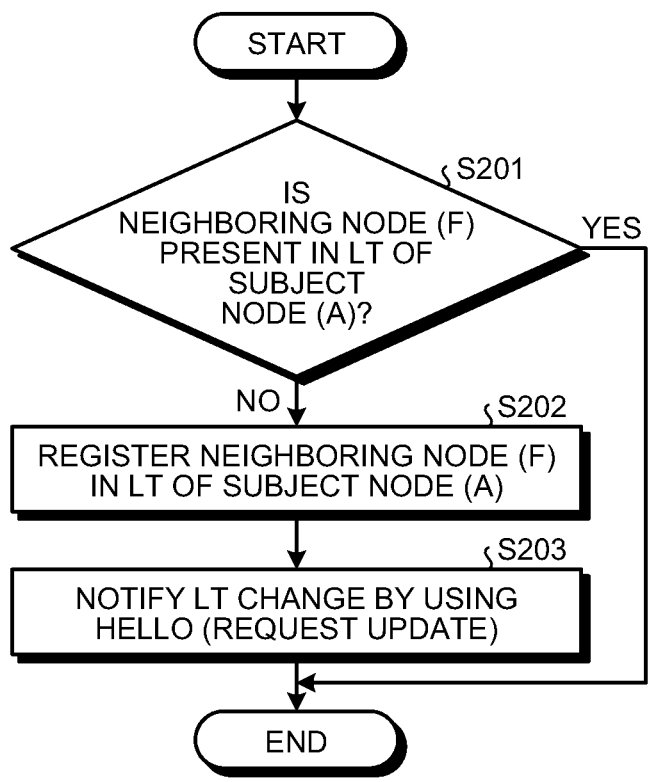
FIG. 11 is a flowchart that illustrates the steps of a node link formation process performed when there is no common neighboring node.

Next, an explanation is given, with reference to FIGS. 10 and 11, of a process performed by a node according to the first embodiment. FIG. 10 is a flowchart that illustrates the steps of a node link formation process performed when there is a common neighboring node. FIG. 11 is a flowchart that illustrates the steps of a node link formation process performed when there is no common neighboring node. In the example of FIG. 10, an explanation is given of a case where links are formed among the node 10A, the node 10B, and the node 10C. In the example of FIG. 11, an explanation is given of a case where a link is formed between the node 10A and the node 10F.

In the example of FIG. 10, an explanation is given of a case where the subject node is the node 10A, the neighboring node that neighbors the node 10A is the node 10B, and the common node that is the common neighboring node between the node 10A and the node 10B is the node 10C. As illustrated in FIG. 10, the node 10A determines whether any of the following links are present: "the subject node 10A→the neighboring node 10B", "the neighboring node 10B→the common node 10C", and "the common node 10C→the subject node 10A" (hereafter, referred to as the "ABC-direction link group") (Step S101).

Accordingly, if the node 10A determines that none of the links are present (No at Step S101), the node 10A proceeds to Step S103. Alternatively, if the node 10A determines that any of the links are present (Yes at Step S101), the node 10A determines whether any of the following links are present: "the subject node 10A→the common node 10C", "the common node 10C→the neighboring node 10B", and "the neighboring node 10B→the subject node 10A" (hereafter, referred to as the "ACB-direction link group") (Step S102).

Accordingly, if the node 10A determines that any of the links are present (Yes at Step S102), the process terminates without any change because the directions of the links are not in one direction and therefore a certain error has occurred. Alternatively, if the node 10A determines that none of the links are present (No at Step S102), the node 10A proceeds to Step S103.

The node 10A then determines whether none of the links in the ABC-direction link group and the ACB-direction link group are present (Step S103). Accordingly, if the node 10A determines that none of the links are present (Yes at Step S103), the node 10A registers the neighboring node 10B in the link table 13c of this node 10A (Step S104). The node 10A then notifies each neighboring node of the change to the link table 13c by using a HELLO frame (Step S105), and the process terminates.

At Step S103, if the node 10A determines that any of the links are present (No at Step S103), the node 10A determines whether any of the links in the ABC-direction link group are present (Step S106). Accordingly, if it is determined that any of the links in the ABC-direction link group are present (Yes at Step S106), it is determined whether the link "the subject node 10A→the neighboring node 10B" is present (Step S107).

Accordingly, if it is determined that the link "the subject node 10A→the neighboring node 10B" is not present (No at Step S107), the node 10A registers the neighboring node 10B in the link table 13c of this node 10A (Step S108). The node 10A then notifies each neighboring node of the change to the link table 13c by using a HELLO frame (Step S105) and then terminates the process. Alternatively, if it is determined that the link "the node 10A→the neighboring node 10B" is present (Yes at Step S107), the node 10A terminates the process without any change.

With reference back to the process at Step S106, if it is determined that none of the links in the ABC-direction link group are present (No at Step S106), the node 10A determines whether the link "the subject node 10A→the common node 10C" is present (Step S109).

Accordingly, if the link "the subject node 10A→the common node 10C" is not present (No at Step S109), the node 10A registers the common node 10C in the link table 13c of this node 10A (Step S110). The node 10A then notifies each neighboring node of the change to the link table 13c by using a HELLO frame (Step S105) and then terminates the process. Alternatively, if the link "the subject node 10A→the common node 10C" is present (Yes at Step S109), the node 10A terminates the process without any change.

Next, an explanation is given, with reference to FIG. 11, of the steps of a node link formation process performed when there is no common neighboring node. In the example of FIG. 11, an explanation is given of a case where the subject node 10A is the node 10A and the neighboring node that neighbors the node 10A is the node 10F. As illustrated in FIG. 11, the node 10A determines whether the neighboring node 10F is present in the link table 13c of this node 10A (Step S201). Accordingly, if the node 10A determines that the neighboring node 10F is present (Yes at Step S201), the node 10A terminates the process without any change.

Alternatively, if the node 10A determines that the neighboring node 10F is not present (No at Step S201), the node 10A registers the neighboring node 10F in the link table 13c of this node 10A (Step S202). The node 10A then notifies each neighboring node of the change to the link table 13c by using a HELLO frame (Step S203) and then terminates the process.

Advantages of First Embodiment

As described above, the node 10 receives, from a neighboring node that is a node in the neighborhood, neighboring node information indicating a node that neighbors the neighboring node. The node 10 determines whether a common neighboring node is present, the common neighboring node being common amongst the neighboring node and the node indicated by the received neighboring node information. If it is determined that a common neighboring node is present, the node 10 registers, in the link table 13c, information that a link on a simplex path is to be formed with the common neighboring node or the neighboring node that is the source of the neighboring node information. Alternatively, if it is determined that a common neighboring node is not present, the node 10 registers, in the link table 13c, information that a link on a duplex path is to be formed with the neighboring node that is the source of the neighboring node information. Thus, it is possible to reduce the size of the link table 13c compared to the case where a link on a duplex path is formed with all the neighboring nodes.

Moreover, in the first embodiment, the node 10 further receives, from a neighboring node, link information that is stored in the link table 13c. The node 10 selects the common neighboring node or the neighboring node that is the source of the neighboring node information in accordance with the link direction indicated by the received link information and registers, in the link table 13c, information that a link on a simplex path is to be formed with the selected node. Thus, the node 10 can ensure that a unidirectional link on a simplex path is formed among three nodes.

[b] Second Embodiment

Although the embodiment of the present invention has been described above, the present invention may be embodied in various different forms other than the embodiment described above. In the following, another embodiment that is included in the present invention will be explained as a second embodiment.

(1) System Configuration, and the Like

Components of each device illustrated are functionally conceptual and do not necessarily need to be physically configured as illustrated in the drawings. Specifically, specific forms of separation and combination of each device are not limited to those depicted in the drawings. A configuration may be such that all or some of devices are functionally or physically separated or combined in an arbitrary unit depending on various types of loads or usage. For example, the simplex-path register unit 12c and the duplex-path register unit 12d may be combined.

(2) Program

Figures 12, 13:
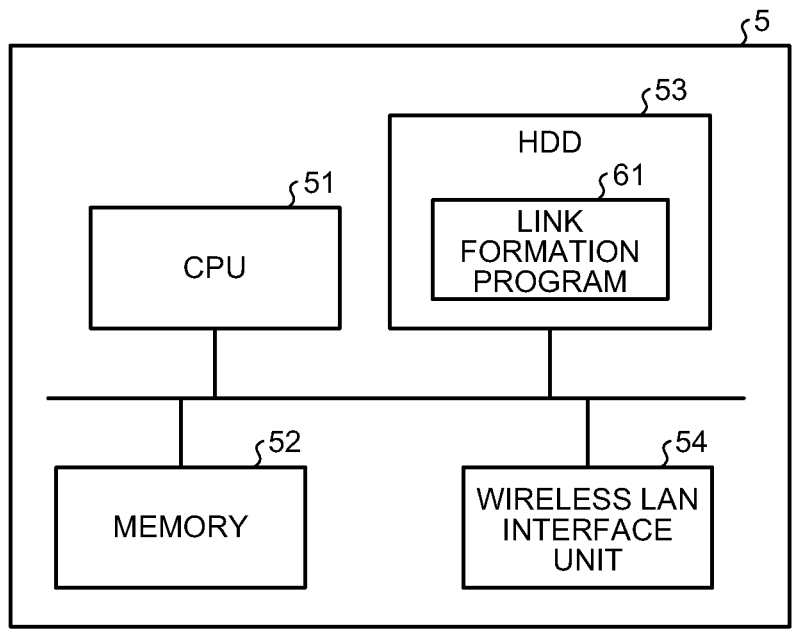
FIG. 12 is a diagram that illustrates a computer that performs a link formation program.
FIG. 13 is a diagram that illustrates an example of a conventional link table.

The various processes that have been described in the above embodiment may be performed if prepared programs are performed by a computer. In the following, an explanation is given below, with reference to FIG. 12, of an example of a computer that performs a program that has the same functionality as that in the above-described embodiment. FIG. 12 is a diagram that illustrates a computer that performs a link formation program.

In a computer 5 illustrated in FIG. 12, a CPU 51, a memory 52, an HDD 53, and a wireless LAN interface unit 54 are connected to one another via a bus. The HDD 53 stores therein a link formation program 61 that corresponds to a communication terminal device. The link formation program 61 may be stored not only in the HDD 53 but may be also stored in, for example, a removable storage medium and may be read by the CPU 51 via a disk drive.

The CPU 51 reads the link formation program 61, loads it to the memory 52, and sequentially performs a link formation process corresponding to the link formation program 61, thereby causing the computer 5 to perform the same operation as that of the disclosed communication terminal device.

The disclosed node allows a reduction in the size of its link table.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node in a wireless ad hoc network including a plurality of nodes, the node comprising a memory and a processor coupled to the memory, the processor being configured to execute a process including:
receiving, from a first neighboring node that neighbors the node, neighboring node information indicating a neighboring node with which the first neighboring node can communicate with one hop;
determining whether a second neighboring node is present, the second neighboring node being a neighboring node that neighbors the node and being a neighboring node indicated by the received neighboring node information;
first registering, when it is determined that the second neighboring node is present, in a storage unit, information that a link on a simplex path is to be formed from the node to either of the second neighboring node and the first neighboring node, wherein the first neighboring node and the second neighboring node each register, in respective storage units thereof, information that a link on a simplex path is to be formed therefrom, so that a loop on a simplex path that includes the node, the first neighboring node and the second neighboring node is formed; and second registering, when it is determined that the second neighboring node is not present, in the storage unit, information that a link on a duplex path is to be formed between the node and the first neighboring node.

2. The node according to claim 1, wherein the receiving includes receiving, respectively from the first neighboring node and the second neighboring node, link information that is respectively stored therein, and indicates a neighboring node that is neighbor thereto and to which a link on a simplex path is formed therefrom, and the first registering includes selecting either of the second neighboring node and the first neighboring node in accordance with a link direction of the loop, indicated by the received link information and registering, in the storage unit of the node, information that a link on a simplex path is to be formed from the node to the selected node.

3. A link formation method for a node that forms a wireless ad hoc network with a plurality of nodes, the node forming a link with a different node, the link formation method comprising:

receiving, from a first neighboring node that neighbors the node, neighboring node information indicating a neighboring node with which the first neighboring node can communicate with one hop;

determining whether a second neighboring node is present, the second neighboring node being a neighboring node that neighbors the node and being a neighboring node indicated by the received neighboring node information;

when it is determined that the second neighboring node is present, registering, in a storage unit, information that a link on a simplex path is to be formed from the node to either of the second neighboring node and the first neighboring node, wherein the first neighboring node and the second neighboring node each register, in respective storage units thereof, information that a link on a simplex path is to be formed therefrom, so that a loop on a simplex path that includes the node, the first neighboring node and the second neighboring node is formed; and when it is determined that the second neighboring node is not present, registering, in the storage unit, information that a link on a duplex path is to be formed between the node and the first neighboring node.

4. The link formation method according to claim 3, further comprising:

receiving, respectively from the first neighboring node and the second neighboring node, link information that is respectively stored therein, and indicates a neighboring node that is neighbor thereto and to which a link on a simplex path is formed therefrom; and selecting either of the second neighboring node and the first neighboring node in accordance with a link direction of the loop indicated by the received link information and registering, in the storage unit of the node, information that a link on a simplex path is to be formed from the node to the selected node.

5. A non-transitory computer-readable storage medium storing therein a link formation program which causes a computer, which is a node that forms a wireless ad hoc network with a plurality of nodes and forms a link with a different node, to execute a process comprising:

receiving, from a first neighboring node that neighbors the node, neighboring node information indicating a neighboring node with which the first neighboring node can communicate with one hop;

determining whether a second neighboring node is present, the second neighboring node being a neighboring node that neighbors the node and being a neighboring node indicated by the received neighboring node information;

when it is determined that the second neighboring node is present, registering, in a storage unit, information that a link on a simplex path is to be formed from the node to either of the second neighboring node and the first neighboring node, wherein the first neighboring node and the second neighboring node each register, in respective storage units thereof, information that a link on a simplex path is to be formed therefrom, so that a loop on a simplex path that includes the node, the first neighboring node and the second neighboring node is formed; and when it is determined that the second neighboring node is not present, registering, in the storage unit, information that a link on a duplex path is to be formed between the node and the first neighboring node.

6. The non-transitory computer-readable storage medium according to claim 5, wherein the process further comprises:

receiving, respectively from the first neighboring node and the second neighboring node, link information that is respectively stored therein, and indicates a neighboring node that is neighbor thereto and to which a link on a simplex path is formed therefrom; and selecting either of the second neighboring node and the first neighboring node in accordance with a link direction of the loop indicated by the received link information and registering, in the storage unit of the node, information that a link on a simplex path is to be formed from the node to the selected node.

* * * * *